United States Patent

Seitz et al.

[19]

[11] Patent Number: 6,029,527
[45] Date of Patent: Feb. 29, 2000

[54] FLUID FLOW RATE MEASURING AND CONTROLLING DEVICE AND METHOD

[75] Inventors: Kurt Seitz, Widnau; Horst Adams, St. Gallen; Markus Hasler, Montlingen, all of Switzerland

[73] Assignee: Wagner International AG, Alstatten, Germany

[21] Appl. No.: 09/045,064

[22] Filed: Mar. 19, 1998

[30] Foreign Application Priority Data

Apr. 2, 1997 [DE] Germany .......................... 197 13 668

[51] Int. Cl.$^7$ ................................ G01F 1/37; F16K 31/12
[52] U.S. Cl. .................................... 73/861.52; 73/861.02; 137/487
[58] Field of Search .......................... 73/861.52, 861.51, 73/861.42, 861.61, 861.44, 861.02; 137/487, 497

[56] References Cited

U.S. PATENT DOCUMENTS

| | | | |
|---|---|---|---|
| 3,701,280 | 10/1972 | Stroman | 73/861.02 |
| 3,765,239 | 10/1973 | Olsson | 73/861.22 |
| 4,277,832 | 7/1981 | Wong | 73/861.42 |
| 4,562,744 | 1/1986 | Hall et al. | 73/861.02 |
| 4,951,224 | 8/1990 | Hokynar | 73/861.02 |
| 5,469,749 | 11/1995 | Shimada et al. | 73/861.02 |
| 5,573,032 | 11/1996 | Lenz et al. | 137/486 |
| 5,613,479 | 3/1997 | Gates et al. | 73/861.52 |

*Primary Examiner*—Harshad Patel
*Attorney, Agent, or Firm*—Fenwick & West LLP

[57] ABSTRACT

A device and method of measuring and controlling the flow rate of a fluid determine analog process variables which are dependent on a volumetric flow of the fluid, and the values thus obtained are converted into digital values, the latter being corrected by an offset value which is dependent on a change of the operating parameters of analog components of the measuring system occurring in the course of operation of the system. To obtain the offset value, an analog process variable is determined during interruptions in operation, when the volumetric flow is zero, and converted into a digital value. This digital value is memorized and used as the offset value when operations are resumed. The digital corrected measured values are supplied to a digital signal processor and the flow rate control is carried out digitally. Preferably, at least one parameter memory is provided for the digital control.

25 Claims, 2 Drawing Sheets

FLUID FLOW RATE MEASURING AND CONTROLLING DEVICE AND METHOD

FIELD OF THE INVENTION

The invention relates to control and measurement of the flow rate of a fluid.

BACKGROUND OF THE INVENTION

Analog flow rate measuring and controlling units are known with which differential pressure measurement is effected by way of an orifice in a flow channel to determine the rate of flow. Following that, the value obtained by this measurement is compared with a desired value in a calculating unit. If the actual value differs from the desired value specified the calculating unit emits a correcting signal for application to a proportional valve unit which then initiates a correcting process to cause the measured value of the flow rate to coincide with the desired value.

A problem with the known flow rate measuring and controlling means is that they are relatively inflexible and cannot readily be matched to changes occuring in system components. Processing of the measurement and control data is substantially predetermined by the system components. While the digital components in their signal processing, fundamentally, are quite free of variations of operating parameters which may occur in the course of operation (e.g. due to aging of the components, thermal drifts, etc.), the sensors, analog amplifiers, analog comparators, and the like are influenced by such drifts.

SUMMARY OF THE INVENTION

It is, therefore, an object of the instant invention to provide a device and a method by which to measure and control the flow rate of a fluid with improved reliability and less susceptibility to disturbance of the measuring and control system while, at the same time, offering maximum flexibility for influencing measurement and control data.

This object is met by a fluid flow rate measuring and controlling method and device which are characterized variously in that the digital values are corrected by an offset value which depends on a change of the operating parameters of analog components of the measuring system in the course of operation of the measuring system, and in that values obtained from flow rate measurements are preprocessed and applied to a digital signal processor, and by correcting each digital value by an offset value which depends on a change of the operating parameters of analog components of the measuring device occurring in the course of operation of the measuring device, and by digitally preprocessing the values obtained, and by a digital signal processor for central control of the flow rate.

The instant invention thus provides methods and devices by means of which signals of the flow rate measurement are largely processed digitally and applied to a digital signal processor (DSP). The signals supplied by the flow rate measuring means first are subjected to digital preprocessing so that any measurement uncertainties due to changes in the analog measuring components, such as thermal drift, are widely compensated. Based on the measured values, the digital signal processor then controls a digital control unit, preferably with the assistance of data from specific digital memory units, and the digital control unit in turn controls a valve unit by way of a valve regulator. In a preferred embodiment, the control unit includes a PID controller. Yet a controller with any desired combination of P-, D-, and I-proportions may also be used, depending on the particular application. The valve regulating means preferably comprises a pulse width modulator, and the valve means preferably includes a proportional valve.

The signal processing which largely is digital allows maximum flexibility and reliability of the measuring and control system.

The analog measured values obtained are converted into digital values which can be corrected, in the digital sphere, by an offset value in order to compensate a change of analog operating parameters of the measuring system occurring in the course of operation, in particular thermal drifting and the like. The simplest way of determining the offset value is by obtaining an analog measured value during interruptions of the operation, when the volumetric flow is zero, and converting it into a digital value. Theoretically, this digital value also would have to be zero when there is zero flow. However, because of the variation or drift mentioned of the analog components, this digital value normally is not equal to zero, and it may be stored directly in an offset memory as the corrective value to be used when the operation of the system is resumed.

Digital signal processing thus has the advantage of offering greater reliability and freedom from interference. Also, the possibility of influencing the measurement and control data is much improved over that of analog systems. For instance, variable operating parameters, especially tables or families of curves, may be stored in specific memory units, preferably programmable ones, to be accessed by the digital signal processor in dependence on the kind of installation, type of fluid, service regulations, operating conditions, etc. Special parameters, characteristics, and the like for control or regulation of the valve unit may also be provided for disturbances or abnormal operating conditions and interruptions of operation, as will be explained in greater detail below.

Finally, it may also be provided that the necessary operating parameters are fed or altered from outside.

DESCRIPTION OF THE DRAWINGS

The invention will be described further, by way of example, with reference to the accompanying drawings, in which.

DETAILED DESCRIPTION OF THE INVENTION

Figure 1:
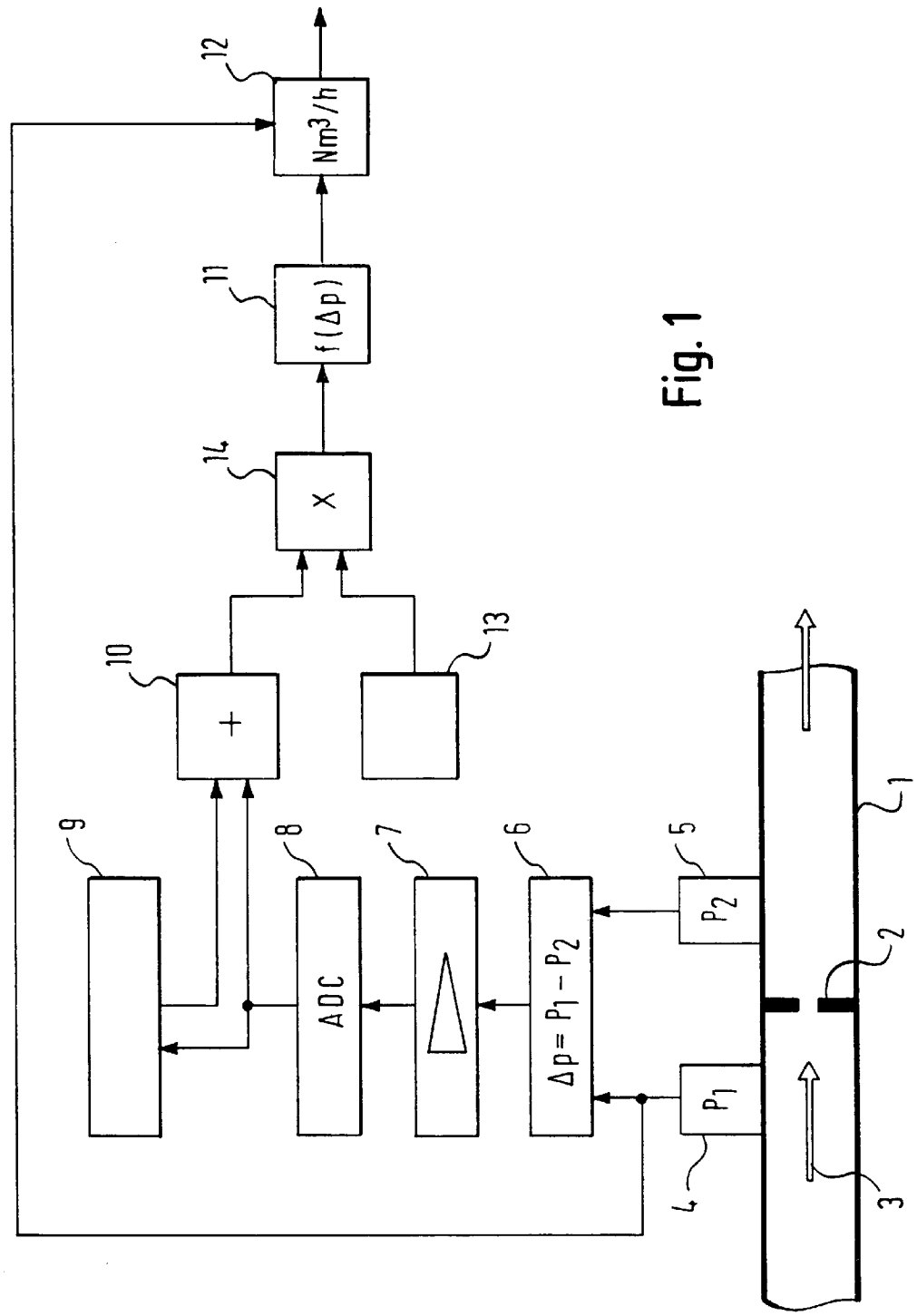
FIG. 1 shows a preferred embodiment of the flow rate measuring device according to the instant invention and FIG. 2 shows a preferred embodiment of a the flow rate control device according to the instant invention, cooperating with the flow rate measuring device.

FIG. 1 is a schematic block diagram of the flow rate measuring device, or Δp unit, according to the invention. In FIG. 1 a flow channel 1 may be seen in which there is a restrictor or orifice 2. A gaseous or liquid medium (fluid) flows in the flow channel in the direction indicated by arrow 3. Upstream of the orifice 2, a first pressure sensor 4 is provided in the wall of the flow channel 1 to measure the pressure $P_1$ in the flow channel upstream of the orifice 2. A second pressure sensor 5 is located downstream of the orifice 2 to measure the pressure $P_2$ in the flow channel 1 directly behind the orifice 2.

The pressure gauges or pressure sensors 4 and 5 convert the pressure values obtained into analog electrical signals which are applied to a differential amplifier 6. In the differential amplifier 6 the difference $\Delta p = P_1 - P_2$ is formed of the two pressure signals. With the cross section A of the flow channel 1 being known, the pressure difference $\Delta p$ is a measure of the volumetric flow of the medium passing through the flow channel.

The signal output of the differential amplifier 6 is applied to an analog amplifier 7 which amplifies the signal amplitude in such a range that it will be the optimum for a subsequent analog/digital converter (ADC) 8. The analog/digital converter 8 converts the differential pressure signal which so far was analog into a digital value.

While the digital components further downstream in the measuring device, and to be described below, are free of thermal drifting and the like, the analog components of the measuring system, in particular sensors 4 and 5 as well as the amplifiers 6 and 7, suffer from an alteration of their operating parameters in the course of operation of the measuring system. They are influenced by thermal drifting, aging, maladjustments, and displacements, etc. The instant invention provides an offset memory 9 to compensate this change in operating parameters of the analog components.

When operation is interrupted, i.e when no fluid flows, the offset memory 9 stores the value furnished by the analog/digital converter. To this end, at least one analog measured value is recorded during such operational interruptions. Ideally, this digital value should be zero when the fluid flow is zero. However, because of the drifts mentioned of the analog components, this value, as a rule, does not equal zero and it may be drawn upon in practice as a correcting value. The digital value of zero volumetric flow is stored in the offset memory 9.

When fluid begins to flow again, the offset value stored in the offset memory 9 is inverted and read. The offset value with its inverted sign is input into an adder 10 where it is added to the value supplied by the analog/digital converter. Thus the offset value which depends on the drift is subtracted from the digital value which corresponds to the measured value so that, essentially, only the pure measured signal is processed further.

Flow operations may be interrupted at any time in order to accomplish the balancing, i.e. to record the offset value which is dependent on the drift. Balancing either is effected during a natural interruption of operations, or such interruption may be provoked by active control at certain intervals in time. The flow is interrupted with the aid of a proportional valve unit which will be described in greater detail below.

As the volumetric flow is not a linear function of the differential pressure $\Delta p$ at the orifice 2, the (corrected) signal from the analog/digital converter 8 is input into a linearizer 11 which is followed by a standardizer 12 so that upon linearization in the linearizer 11 and standardization in the standardizer 12, e.g. to an input pressure $P_1$ measured at the pressure sensor 4, a signal reflecting the volumetric flow of the fluid in the flow channel 1 in standard meters$^3$/hour (Nm$^3$/h) will be available at the output of the measuring device.

Apart from the offset memory 9 described above, the measuring device further may comprise a scaling or gauging memory 13 which stores gauging parameters to enable the measured value output by the standardizer 12 to be gauged again to the actual volumetric flow after the orifice 2 has been exchanged. That is especially advantageous if manufacturing tolerances of the orifice dimension are to be balanced. In this event the measuring device is gauged with respect to an external gauging means and the correcting values required are stored digitally in the gauging memory 13. The correcting values which are recorded in the gauging memory 13 are impressed on the digital measured signal by means of a multiplier 14.

The measuring device according to the invention is highly advantageous over the known state of the art in that the largely digital signal processing with the assistance of the offset memory 9 helps to compensate changing operational parameters of the analog components occurring in the course of time during service of the measuring device. These changes above all relate to thermal drifts, aging of the components, and the like. Moreover, it is easy to incorporate in the measuring system additional gauging to various orifice diameters, flow channel diameters, pressure gauge characteristics, or other hardware parameters specific of a particular installation, as well as fluid properties. Adequate sets of parameters and correcting values are simply stored in the gauging memory 13. It is likewise possible to provide for subsequent external loading of the gauging memory with values for correction.

The combination of features described above results in a flexible measuring system which is extremely insensitive to any disturbance.

Figure 2:
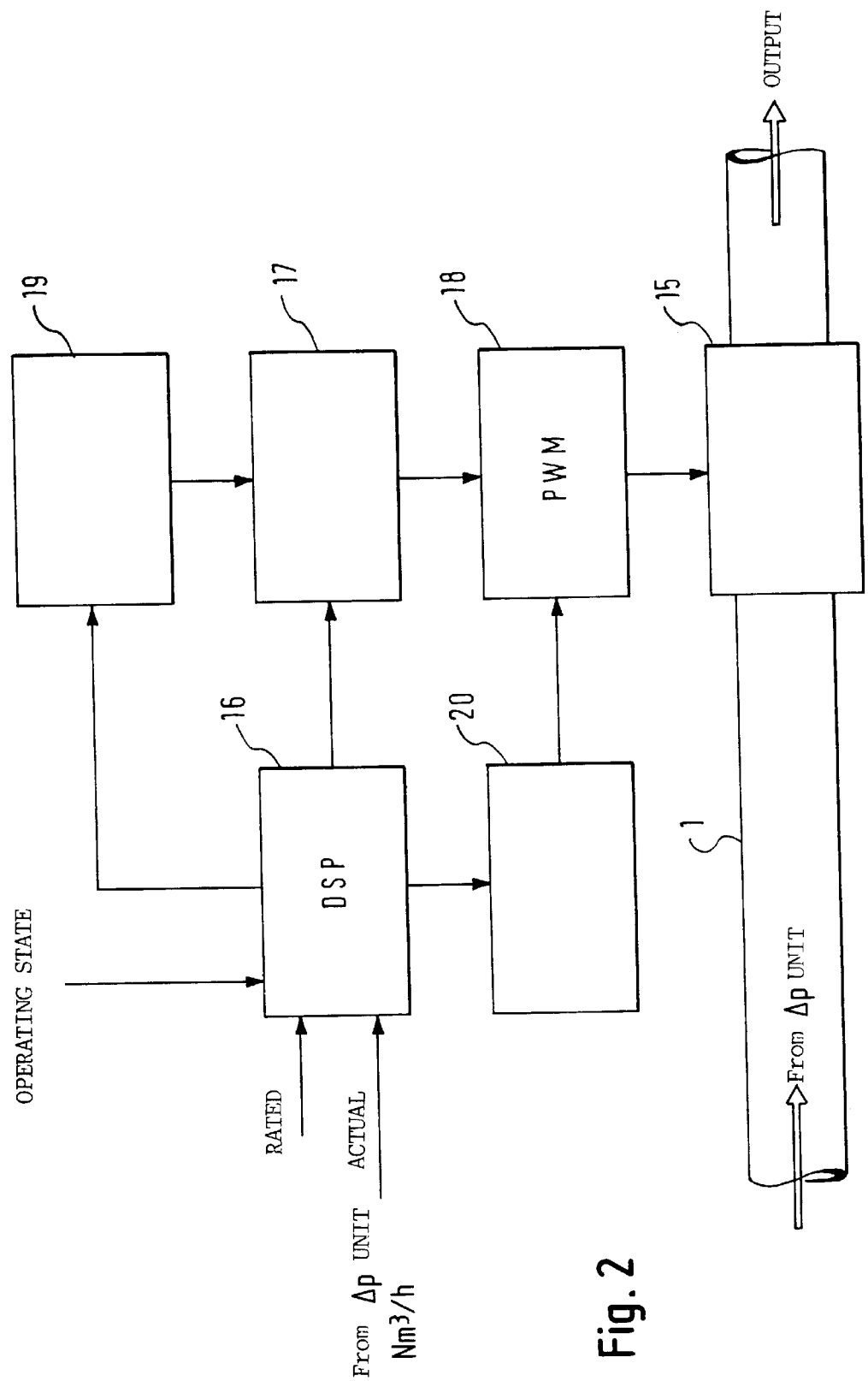

FIG. 2 is a basic diagram of a digital flow-through device for gases and liquids, which device preferably operates in combination with the flow rate measuring device of FIG. 1. This device receives the actual flow rate values from the flow rate measuring device in digital form and preferably preprocessed, as described above. The flow rate control device illustrated in FIG. 2 further processes these signals in digital form so as to drive a proportional valve unit 15 which controls the volumetric flow of the gaseous or liquid medium (fluid) in the flow channel 1.

The basic elements of the flow rate control device according to the invention are a digital controller 17 and a regulating means 18. The controller 17 preferably is a PID controller, but a proportional controller may also be implemented by proper selection of the P-, I-, and D-proportions, and a PI controller may be used as well. The regulating means 18 preferably includes a pulse width modulator which feeds control signals to the proportional valve unit 15. The proportional valve, of course, may be replaced by any other suitable valve means.

In the preferred embodiment of the digital flow rate control there is at least one additional memory means for storing variable operating parameters. It stores regulating parameters for the pulse width modulator 18 and/or control parameters for the controller 17. This memory means preferably is adapted to be programmed. It is also possible to provide for external input of operating parameters into this memory. To this end the digital signal processor 16 preferably is linked to an external network.

In the case of the embodiment shown in FIG. 2 the memory means comprises a control parameter memory 19 and a regulating parameter memory 20. In the actual implementation the control parameter memory 19 is a PID setting memory and the regulating parameter memory 20 is a PWM setting memory. FIG. 2 demonstrates how the various elements are interconnected.

Flow rate control takes place as follows: The digital actual flow rate value from the flow rate measuring device of FIG. 1, duly corrected, linearized, and standardized, if desired, is input into the digital signal processor (DSP) 16. A desired flow rate value may be entered into a second input terminal of the DSP 16. The DSP 16 compares the actual and desired values and generates a digital output signal which reflects the difference between those two values. This output signal is applied to the controller 17 connected downstream. The controller 17 generates a corresponding control signal for the pulse width modulator (PWM) 18 which is connected downstream thereof and in turn drives the proportional valve unit 15.

The proportional, integral, and differential portions of the control characteristic of the controller 17 needed for the control operation either may be given directly by the DSP 16 or fetched from the additional PID setting memory 19. The latter is useful particularly if the control characteristic of the flow rate control device is to be matched to a specific plant configuration. In this event, the control parameters preferably are optimized once prior to putting the plant into operation and then are firmly stored digitally in the PID setting memory 19. This way of proceeding is referred to as the static method.

According to an alternative concept, called the dynamic method, the optimum proportional, integral, and differential portions destined for the controller 17 are each determined in response to the respective operating condition. To this end the DSP 16 determines an operating state based on an operating state signal which is entered into the DSP 16 from any part of the plant or from an external network. In response to this operating state, the DSP 16 either may calculate the proportional, integral, and differential proportions itself, i.e. the parameters for the controller 17, or it may take access to corresponding values in the PID setting memory 19 in order to properly adjust the controller 17.

Therefore, it is convenient for the PID setting memory to contain a plurality of sets of parameters, or families of curves for the operating states, etc.

Of course, the static and dynamic methods also may be used in combination. During normal operation, for instance, the predetermined parameters to be given the controller 17 are taken from the PID setting memory 19, and during special operating states (e.g. start-up of the plant, extreme deviation of the actual value from the desired value, or disturbances of the plant) the DSP 16 takes over the fixing of the control characteristic as soon as it has been informed of this extraordinary state of affairs.

As already mentioned, a PWM 18 is provided to drive the proportional valve unit 15. In the embodiment shown in FIG. 2 it is associated with a pulse width modulator setting memory 20. This memory stores certain drive functions of the PWM 18 to which direct access may be had, in response to the operating states determined in the DSP 16, in order to drive the PWM 18, i.e. the regulating means, directly in respect of these operating states. Provision of the PWM setting memory 20 makes it unnecessary to take the detour via calculating or predetermining the PID parameters for the controller 17 and their application in the controller. This may be particularly useful, for example, if the flow-through must be stopped completely for a short time (e.g. to determine the drift correction values for the offset memory of FIG. 1) and, immediately afterwards, the control values valid before the shut-down are to be returned to.

Without corresponding predetermination of the values from the PWM setting memory 20, the big difference between the actual and desired values upon renewed switch-on in this case would first cause the differential part of the PID controller 17 to be activated, then the proportional part, and finally the integral part and that would involve a considerable delay in time before the proportional valve unit 15 reached the given desired value once more. Now, in such a case the DSP 16, with the assistance of the PWM setting memory 20, can fetch the adequate setting value for the desired operating state immediately and feed it directly into the PWM 18. In this manner the desired operating state is reached very quickly.

Other sets of parameters of the PWM 18, of course, may also be stored in the PWM setting memory 20 so that a direct control function may be released in response to certain operating conditions of which the DSP 16 is informed. Thus the PID setting memory 19, in the first place, serves for memorizing and quick recalling of PID controller parameters for the controller 17, especially so as to adapt the control characteristic of the flow rate control device to certain plant configurations. The PWM setting memory, on the other hand, serves for memorizing and quick recalling of pulse width modulation parameters, especially so as to permit rapid, purposive control of the proportional valve unit 15 in case of special operating conditions or disturbances of the plant. Provision may be made for this control via the PWM setting memory to have precedence over the input of the correcting variables from the controller 17.

Certain operating states as well as sets of parameters for both memories 18 and 19 also may be input via a higher-level network.

The features disclosed in the above specification, in the claims, and drawing may be significant for the realization of the invention in its various modifications, both individually and in any combination. In particular, the devices and methods described here for measuring and controlling the flow rate of a fluid may be used separately as well as, preferably, in combination to achieve almost completely digital measurement and control of the rate of flow.

What is claimed is:

1. A method of measuring the flow rate of a fluid in a measuring system which determines at least one analog value of a selected operating parameter dependent upon a volumetric flow of the fluid and converts the analog value into a digital value, the method comprising:

interrupting the volumetric flow substantially to zero flow;

determining during interrupted flow an offset value of the selected parameter indicative of a change of operating parameters of components of the measuring system during the operation thereof;

storing the offset value; and altering the digital value of the selected parameter determined during volumetric flow in response to the offset value.

2. The method as claimed in claim 1, characterized in that during operation the offset value is subtracted from each digital value.

3. The method as claimed in claim 1, characterized in that the altered digital value is normalized.

4. The method as claimed in claim 1, characterized in that the analog valve of a selected operating parameter is a pressure difference in a flow channel (1) through which the fluid flows, the difference being determined between two measuring points located downstream and upstream, respectively, of an orifice (2).

5. The method as claimed in claim 1, characterized in that the altered digital value is linearized to be proportional to the volumetric flow to be measured.

6. The method as claimed in claim 5, characterized in that pulse width modulation is carried out to generate a correcting variable.

7. The method as claimed in claim 5 in the measuring system including a digital signal processor, characterized in that during operation, the digital signal processor (16) can influence parameters needed for control or for generating a correcting variable.

8. The method as claimed in claim 7, characterized in that the parameters are memorized, calculated, or entered from outside.

9. The method as claimed in claim 1, 2, 3, 4, or 5 characterized in that the flow rate is controlled digitally.

10. A fluid flow rate measuring device, comprising:

means for interrupting the fluid flow to a reference volumetric flow;

means (2, 4–7) for determining analog process variables which are dependent on a volumetric flow of the fluid, an analog/digital converter (8) for converting the analog values obtained into digital values, and offset means (9) for correcting each digital value by an offset value which depends on a change of the operating parameters of analog components (4, 5, 6, 7) of the measuring device occurring in the course of operation of the measuring, said offset means comprising an offset memory (9) in which at least one offset value is stored that is derived from an analog value obtained from the reference volumetric flow.

11. The device as claimed in claim 10, characterized in that the reference volumetric flow is zero.

12. The device as claimed in claim 10 or 11, characterized by a subtractor (10) for substracting the offset value from each digital value during operation of the measuring device.

13. The device as claimed in claim 10 characterized by a normalized means (13) for normalizing the offset value.

14. The device as claimed in claim 10, characterized by a linearizing means (11) for linearizing the offset value.

15. The device as claimed in claim 10, characterized in that the means for determining the analog process variables is a pressure differential measuring means comprising an orifice (2) in a flow channel through which the fluid flows and further comprising pressure sensors (4, 5) at two measuring points located downstream and upstream, respectively, of the orifice.

16. The device as claimed in claim 10, characterized by a digital signal processor (16) for control of the flow rate.

17. The device as claimed in claim 16, characterized by a valve means (15), a valve regulating means (18) for control of the valve means, and valve control parameter setting means (20) for varying parameters of the valve regulating means.

18. The device as claimed in claim 17, characterized in that the valve regulating means comprises a pulse width modulator (18).

19. The device as claimed in claim 17, characterized in that the valve control parameter setting means comprise a control parameter memory (20).

20. The device as claimed in claim 17, characterized by a digital control means (17) for controlling said valve regulating means.

21. The device as claimed in claim 20, characterized in that the digital control means comprises a PID controller (17).

22. The device as claimed in claim 20, characterized by parameter setting means (19) for varying parameters of the digital control means.

23. The device as claimed in claim 22, characterized in that the parameter setting means comprise a control parameter memory (19).

24. The device as claimed in claim 16, characterized by a programmable memory means (19, 20) for storing variable operating parameters.

25. The device as claimed in claim 16 characterized in that the digital signal processor (16) is adapted to be coupled to a higher-level network for the input of operating parameters.

* * * * *